United States Patent [19]

Gelardi

[11] Patent Number: 5,531,953
[45] Date of Patent: Jul. 2, 1996

[54] PROCESS OF MAKING A ONE-PIECE BOX

[75] Inventor: John A. Gelardi, Kennebunkport, Me.

[73] Assignee: DIC Digital Supply Corp., Fort Lee, N.J.

[21] Appl. No.: 272,845

[22] Filed: Jul. 11, 1994

Related U.S. Application Data

[62] Division of Ser. No. 145,680, Nov. 4, 1993, Pat. No. 5,368,163, which is a continuation of Ser. No. 925,216, Aug. 6, 1992, abandoned.

[51] Int. Cl.$^6$ .................................................. B29C 45/00
[52] U.S. Cl. ................ 264/296; 264/328.1; 264/331.15; 264/334
[58] Field of Search ............................... 264/296, 328.1, 264/331.15, 334

[56] References Cited

U.S. PATENT DOCUMENTS

| | | | |
|---|---|---|---|
| 3,670,875 | 6/1972 | Jones | 206/408 |
| 3,900,171 | 8/1975 | Serizawa | 242/338.4 |
| 3,980,255 | 9/1976 | Serizawa | 242/347.1 |

FOREIGN PATENT DOCUMENTS

| | | |
|---|---|---|
| 992942 | 7/1976 | Canada. |
| 1064005 | 10/1979 | Canada. |

*Primary Examiner*—Leo B. Tentoni
*Attorney, Agent, or Firm*—Fitzpatrick, Cella, Harper & Scinto

[57] ABSTRACT

A one piece molded box for the storage of magnetic media devices having a cover and a base which are connected by an integrally formed hinge member. The hinge is spaced from the corner of the box allowing the box to rotate to an open position about an axis in the midsection of the outer wall of the box. The box is made of a soft copolymer plastic of polypropylene and polyethylene since these materials allow the hinge member to be flexed numerous times without breaking, are impact resistant and combine to form a transparent plastic. The cover portion of the box has protrusions on the outside of opposite sidewalls which correspond to recesses on the inside of opposite sidewalls of the base section and keep the box closed. When in the open position the tape remains in the cover portion of the box for easy insertion and removal. A method of molding a one piece box for the storage of magnetic media devices.

4 Claims, 5 Drawing Sheets

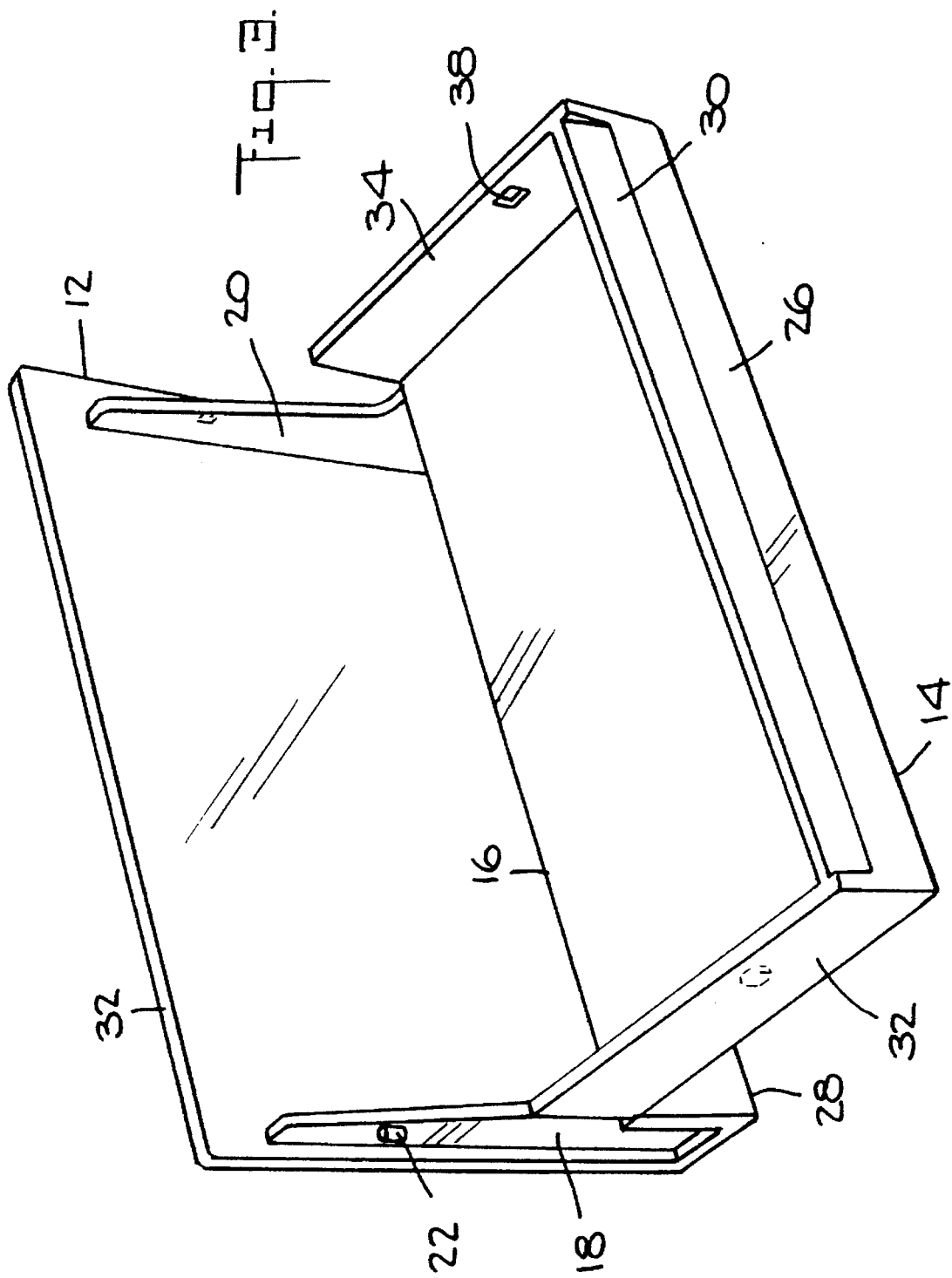

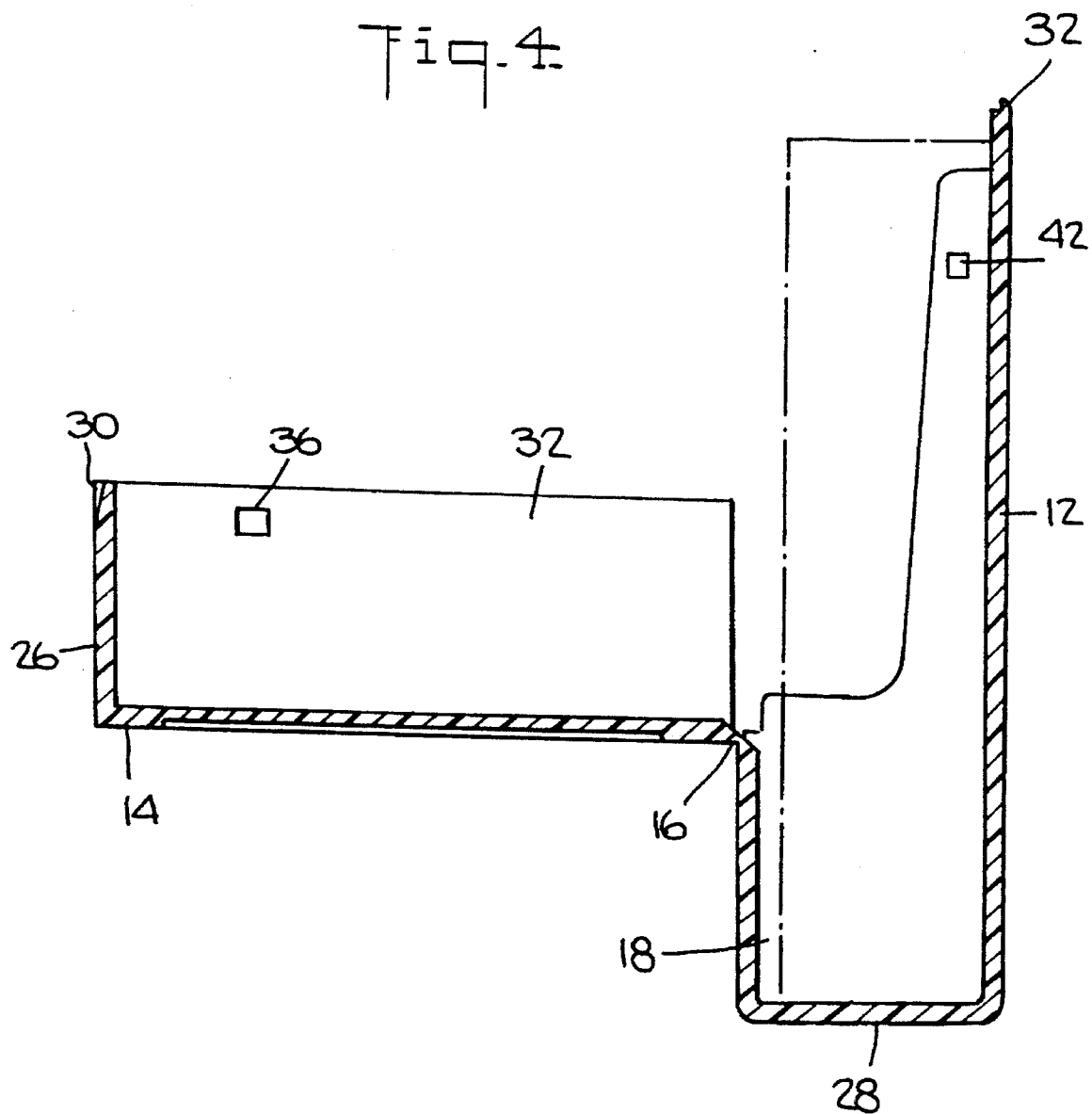

PROCESS OF MAKING A ONE-PIECE BOX

This application is a division of application Ser. No. 08/145,680 filed Nov. 4, 1993, which is a continuation of now abandoned application Ser. No. 07/925,216 filed Aug. 6, 1992 application Ser. No. 08/145,680 issued as U.S. Pat. No. 5,368,163 dated Nov. 29, 1994.

BACKGROUND OF THE INVENTION

1. Field of the Invention

The present invention relates generally to a novel molded one piece box construction for the storage of magnetic media devices. Particularly the invention relates to a novel molded one piece box construction for the storage of 8 mm Digital Audio Tapes (DATS) or 8 mm Digital Video Tapes (DVTs). More specifically the invention relates to a novel box construction for the storage of DATs or DVTs wherein the DAT or DVT remains in the cover section of the box when it is in the open position, thereby allowing easy access to the cassette for removal and placement. Furthermore the invention particularly relates to a novel box construction for the storage of magnetic media devices which is of a one-piece construction and has an elongated integrally-formed hinge member which is spaced from the corner of the box allowing the box to rotate to an open position about an axis in the midsection of the outer wall of the box. Additionally, the invention relates to a method of constructing a novel box for the storage of magnetic media devices where the box is molded as one-piece in the open position, thereby allowing the elongated integrally-formed hinge member to be spaced from the corner of the box.

2. Prior Art

Boxes for the storage of magnetic media devices, particularly cassette tapes, have been heretofore generally available and their conventional construction is well known. In general, such boxes are constructed of two pieces, a base and a cover, which, in the closed position, completely enclose the tape. The box may be formed of transparent plastic material so that the contents can be viewed without opening the box. Typically such boxes are formed of a hard transparent plastic material which may crack, melt or otherwise become deformed when exposed to heat or pressure. The cover and base of such boxes are pivotally connected by matching recesses and protrusions at opposing corners of the back of the box. Boxes constructed in this manner often separate when opened. In addition, the construction is such that it can result in the tape inadvertently falling out.

One piece construction of boxes for the storage of magnetic media devices, particularly tape cassettes, is also known in the art. In one embodiment, such boxes do not completely enclose the tape but instead have one side open to permit access to the tape. Tapes stored in boxes constructed in this manner fall out easily and are exposed to dust, water and other elements which may damage the tapes. Such boxes are also typically formed of a hard transparent plastic material, so that the contents may be viewed while still in the box, which may crack, melt or otherwise become deformed when exposed to heat or pressure. In another embodiment, one piece boxes which completely enclose the tape are molded so that the hinge is located at the spine of the box. In these boxes the tape does not remain in the cover in the open position.

SUMMARY OF THE INVENTION

To overcome the difficulties in the prior art, it is an object of the present invention to provide a box for the storage of magnetic media devices which is molded as a one piece box with a cover and a base which completely encloses the magnetic media device in the closed position. The base and cover are connected by an elongated integrally-formed hinge member which is spaced from the corner of the box and allows the box to rotate to an open position about an axis in the midsection of the outer wall of the box thereby preventing the box from falling apart.

Another object of the invention is to provide a box for the storage of magnetic media devices in which the magnetic media device remains in the cover of the box when the box is in the open position.

A further object of the invention is to provide a box for storage of magnetic media devices which is constructed to conform to the size and dimensions of 8 mm Digital Audio Tapes (DATs) or 8 mm Digital Video Tapes (DVTs).

A further object of the invention is to provide a box for the storage of magnetic media devices which is formed of a soft copolymer plastic comprised of polypropylene and polyethylene, is generally impervious to damage from pressure and heat in normal use and is flexible and transparent.

In order to accomplish the aforementioned and other objects, a design box for the storage of magnetic media devices, particularly 8 mm DATS or 8 mm DVTs, according to the invention, provides a molded one piece box with a cover and a base. The cover and base are connected by an elongated integrally-formed hinge member. The hinge member is formed preferably at about a 45° angle from the cover and spaced from the corner of the box allowing the box to rotate to an open position about an axis in the midsection of the outer wall of the box. The cover and base have matching recesses and protrusions which operate to keep the box closed. The base has an elongated depression along the front panel which allows contact with the front edge of the cover for ease in opening the box.

The one piece box of the present invention is molded by standard injection molding methods and equipment. This allows it to be molded as one piece in the open position such that the hinge is formed a distance from the spine of the cover and a pocket or sleeve is formed in the cover which retains the tape when the box is in the open position. The box is constructed from a copolymer plastic which is composed of polypropylene and polyethylene. The proportions of polypropylene and polyethylene chosen are adjustable so as to result in a soft plastic which is impact resistant, flexible and transparent.

BRIEF DESCRIPTION OF THE DRAWINGS

The present invention will be understood more fully from the detailed description given here below and from the accompanying drawings of the preferred embodiment of the invention, which, however, should not be taken to limit the invention to the specific embodiments, but are for explanation and understanding only.

In the drawings:

FIG. 3 is a view of the box in the open position in which it is molded; and FIG. 4 is a cross sectional view of the box in the open position.

DESCRIPTION OF THE PREFERRED EMBODIMENT

Figure 1:
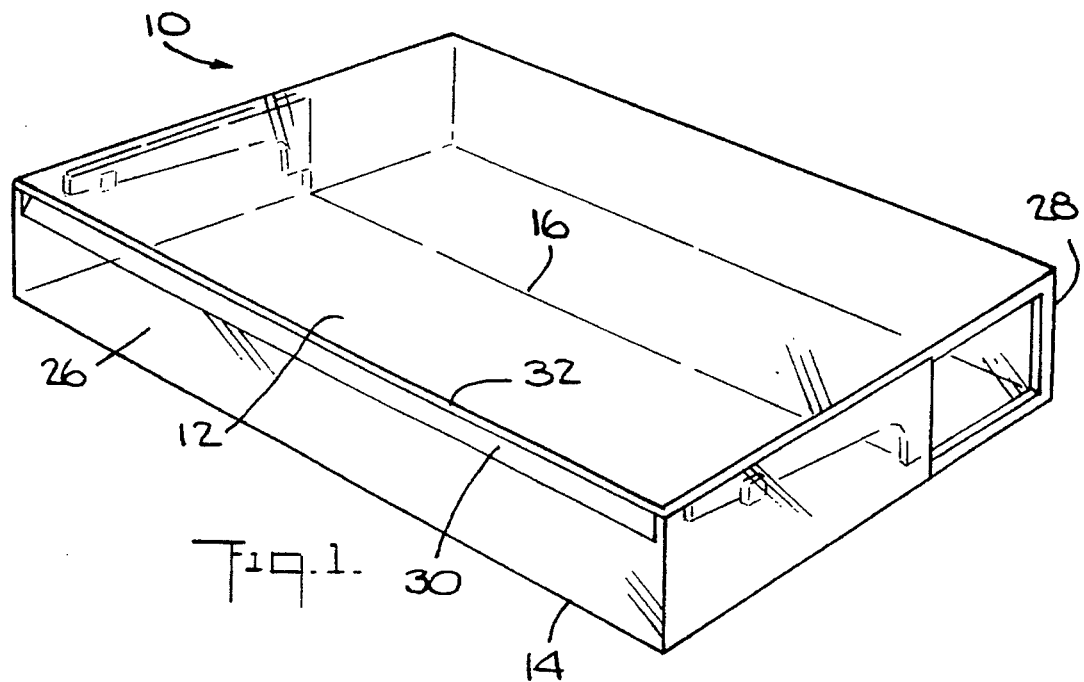
FIG. 1 is an exploded perspective view of a closed molded one piece box for storing magnetic media devices.
Figure 2:
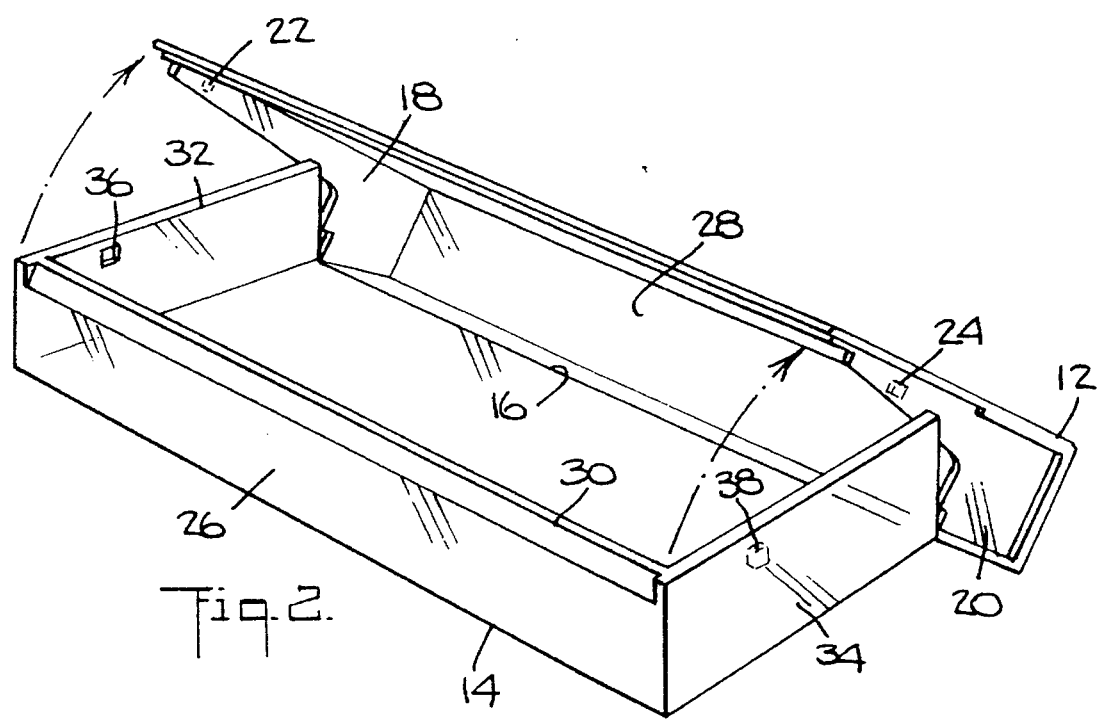
FIG. 2 is a view of the box in a partially open position.
Figure 6:
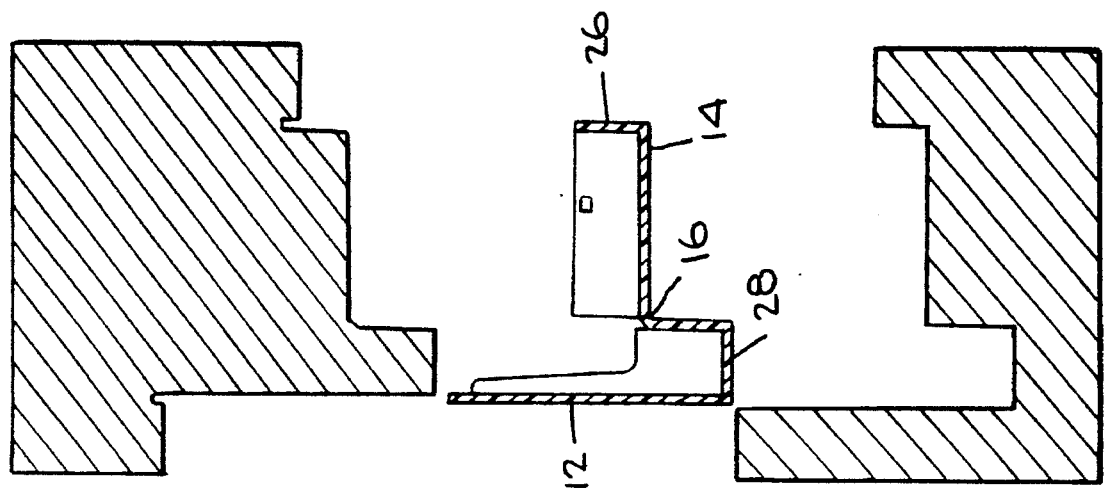
FIG. 6 is a detailed view of the mold in the open position and the box as it appears immediately after being molded.
Figure 5:
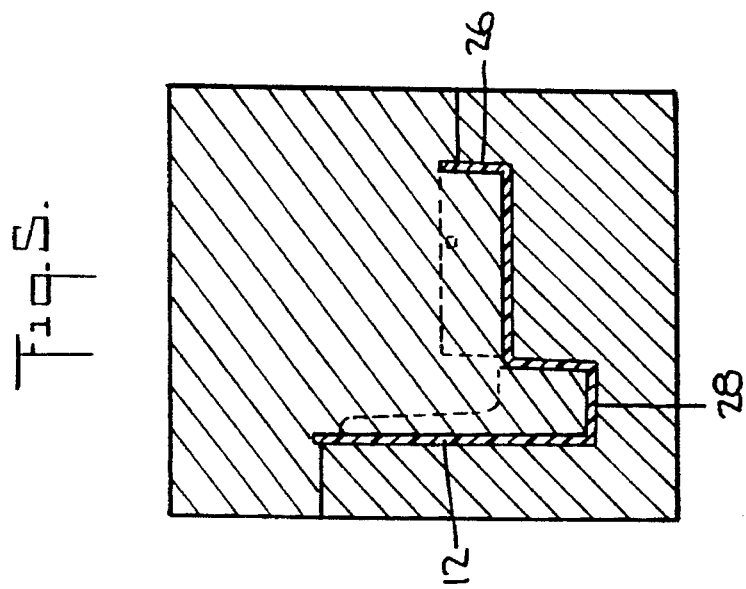
FIG. 5 is a view of the box in the open position, in a closed mold.

Referring now to drawings, and particularly FIGS. 1, 2 & 3, a box for the storage of magnetic media devices 10, which is preferably composed of a soft copolymer plastic of polypropylene and polyethylene molded in the open position by standard injection molding methods and equipment, as shown in FIGS. 5 & 6, has a cover 12 and a base 14 which are connected by an elongated integrally-formed hinge member 16. The cover 12 has opposed sidewalls 18 and 20, which diminish in width beginning at the hinge member 16 such that in the preferred embodiment the opposed sidewalls 18 and 20 have a width at the back of the box 10 which is substantially less than about 3.0 but substantially greater than about 2.0 times the width at the front of the box 10. Protrusions are provided on the outside of the opposed sidewalls of the cover 22 and 24 for purposes hereinafter set forth.

Figure 7:
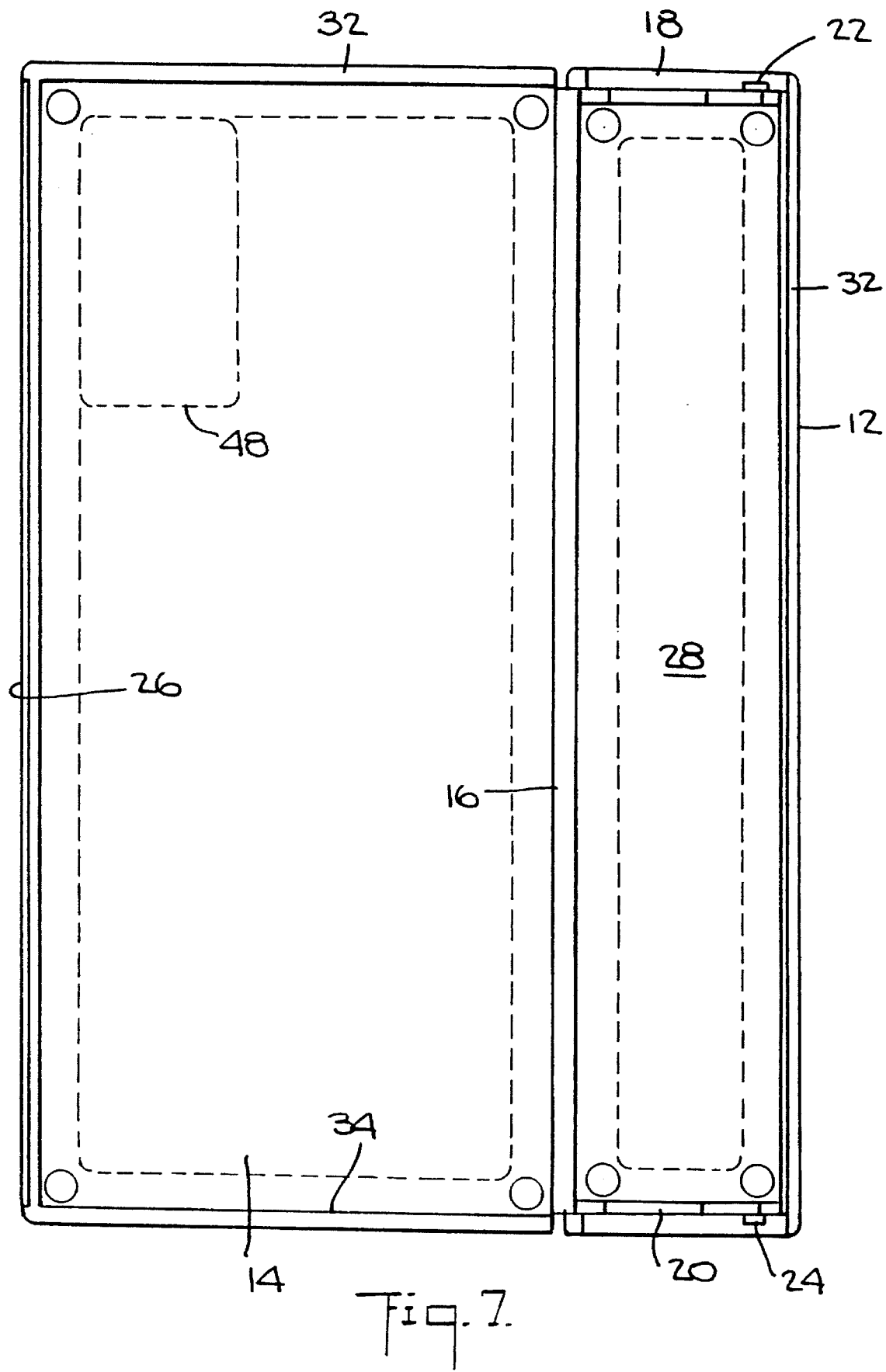
FIG. 7 is a top view of the box in the closed position.

As shown best in FIGS. 1 and 2, the base 14 has a front panel 26 and a back panel 28. The front panel 26 has an elongated depression 30 which creates an overlap of the front edge of the cover 32 when the box 10 is in the closed position, as shown in FIG. 1, and allows for ease in opening the box 10, as shown in FIG. 2. The base 14 has opposed sidewalls 32 and 34 with recesses 36 and 38 on the inside of said opposed sidewalls 32 and 34, which accommodate the protrusions on the outside of the opposed sidewalls of the cover 22 and 24 in the closed position, as shown best in FIG. 1, and keep the box 10 closed. The hinge member 16 forms preferably a 45° angle with the cover 12 when the box 10 is in the open position. The box 10 has an integrally formed area for the placement of graphics 48. As shown best in FIG. 7, in the preferred embodiment there is an integrally-formed rectangular area 48 in the left front corner of the base 14 into which graphics may be placed to identify the contents of the box 10.

To open the box 10 the user places a thumb or finger under the front edge of the cover 32 in the elongated depression 30 on the front panel 26 of the base 14. By pushing in an upward motion against the front edge of the cover 32, the user disengages the protrusions on the outside of the opposed sidewalls of the cover 22 and 24 from the recesses on the inside of the opposed sidewalls of the base 36 and 38, which allows the box 10 to open, as shown in FIG. 2. The cover 12 rotates from a horizontal to a vertical position about an axis in the midsection of the outer wall at the location of the elongated hinge member 16. In the fully open position the base 14 is perpendicular to the cover 12 at an angle formed about the elongated hinge member 16. The tape remains in the cover 12 when the box 10 is in the open position for ease in removal from, and placement in, the box 10.

To close the box 10 the cover 12 is rotated about the axis located at the elongated hinge member 16 from a vertical to a horizontal position. The opposed sidewalls of the base 32 and 34 overlap the opposed sidewalls of the cover 18 and 20 so that the protrusions on the outside of the opposed sidewalls of the cover 22 and 24 correspond to the recesses on the inside of the opposed sidewalls of the base 36 and 38. When the base 14 and cover 12 are closed the protrusions 22 and 24 become interposed with the corresponding recesses 36 and 38 and operate to keep the box 10 in the closed position.

As shown best in FIGS. 4, 5 & 6 another unique feature of the invention is the method of molding the box 10. The box 10 is molded by standard injection molding methods and equipment such that the cover 12 is formed remote from the base 14 so that the elongated hinge 16 is spaced from the spine of the box 10. In the preferred embodiment the cover 12 is preferably molded at a 90° angle from the base 14 so that the cover 12 is composed of five integrally connected walls which form a partial or full sleeve, into which the magnetic device can be placed. As shown in FIGS. 5 and 6, molding the box 10 in this manner decreases the projected area so that a smaller molding machine can be used, thus decreasing a manufacturer's cost. The mold is composed conventionally of a core, and a cavity. The copolymer plastic is injected into the cavity in accordance with generally understood techniques at the appropriate temperature and pressure to fill the mold. The copolymer plastic is retained in the mold for a sufficient amount of time to form the completed structure after which it is released by conventional means, cooled and folded into the closed position.

What is claimed is:

1. A method of molding a one piece box having a front panel, a back panel, a cover and a base for the storage of articles, which comprises the steps of:

injecting a composition comprising a plastic polymer into a mold having a cavity and a core, which results in a plastic box;

arranging said cavity and said core such that an integrally molded hinge member is located at the midsection of said base and said box is molded in an open position such that said cover, back panel and base are molded in a fixed relation where a portion of said base located between said back panel and hinge member is generally parallel to the length of said cover;

retaining said plastic polymer in said mold for a time sufficient to form said box; and releasing said box from said mold while said box is in the open position.

2. A method for molding a one-piece box as recited in claim 1 wherein said box is molded such that an upper portion of said base is formed at about a 90° angle at said intergral hinge member from a lower portion of said base.

3. A method of molding a one piece box for the storage of articles comprising the steps of:

injecting a composition comprising a plastic polymer into a mold having a cavity and a core, which results in a plastic box;

arranging said cavity and said core to form a one piece box having a cover, a front panel, a back panel and a base which are molded in an open position and where an integral hinge member is located at the midsection of said base to permit rotation of an upper portion of said base from the open position to a closed article-storing position, said hinge member being spaced from said back panel and said cover, back panel and base are molded in a fixed relation where a lower portion of said base is generally parallel to the entire length of said cover;

retaining said plastic polymer in said mold for a time sufficient to form said box; and releasing said box from said mold while said box is in the open position.

4. A method of molding a one piece box as recited in claim 3 wherein said cavity and said core are arranged such that an upper portion of said base is formed at about a 90° angle from a lower portion of said base.

* * * * *